(12) United States Patent
Abdel-Ghaffar

(10) Patent No.: US 7,765,422 B2
(45) Date of Patent: Jul. 27, 2010

(54) METHOD OF DETERMINING A TIME OFFSET ESTIMATE BETWEEN A CENTRAL NODE AND A SECONDARY NODE

(75) Inventor: Hisham S. Abdel-Ghaffar, Eatontown, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1900 days.

(21) Appl. No.: 09/764,072

(22) Filed: Jan. 19, 2001

(65) Prior Publication Data

US 2002/0133733 A1 Sep. 19, 2002

(51) Int. Cl.
G06F 1/00 (2006.01)
G06F 1/12 (2006.01)
G06F 13/42 (2006.01)

(52) U.S. Cl. .................. 713/400; 713/500; 713/600

(58) Field of Classification Search .......... 713/400; 455/67.16; 370/235, 236, 257, 347, 350
See application file for complete search history.

(56) References Cited

U.S. PATENT DOCUMENTS

| | | | |
|---|---|---|---|
| 5,517,495 A * | 5/1996 | Lund et al. | 370/399 |
| 5,757,772 A * | 5/1998 | Thornberg et al. | 370/236 |
| 5,864,540 A * | 1/1999 | Bonomi et al. | 370/235 |
| 5,958,060 A * | 9/1999 | Premerlani | 713/400 |
| 6,212,171 B1 * | 4/2001 | LaFollette et al. | 370/257 |
| 6,366,762 B1 * | 4/2002 | Miller et al. | 455/67.16 |
| 6,389,019 B1 * | 5/2002 | Fan et al. | 370/395.42 |
| 6,526,039 B1 * | 2/2003 | Dahlman et al. | 370/350 |
| 6,545,979 B1 * | 4/2003 | Poulin | 370/241.1 |
| 6,600,731 B2 * | 7/2003 | Menzel et al. | 370/347 |

FOREIGN PATENT DOCUMENTS

JP 01036147 A * 2/1989

OTHER PUBLICATIONS

Schachat Ken, Re: timing, Mar. 10, 1994.*
Purplemath, Basic Number Properties: Associative, Commutative, and Distributive, 2007 pp. 1-4.*
The Math Forum @ Drexel, Order of Operations vs. Associative Property, Oct. 10, 2002, pp. 1-4.*
Mills, David L., Internet Time Synchronization: The Network Time Protocol, IEEE Transcations on Communications, vol. 39, No. 10, Oct. 1991, pp. 1482-1493.
Mills, David L., "Improved Algorithms for Synchronizing Computer Network Clocks" IEEE/ACM Transactions on Networking, vol. 3, No. 3, Jun. 1995. pp. 245-254.
Paxson, Vern, "On Calibrating Measurements of Packet Transit Times," Network Research Group, Lawrence Berkeley National Laboratory, Univ. of CA, Berkeley, LBNL-41535, 1998 Conference, pp. 1-13.

* cited by examiner

*Primary Examiner*—Mark Connolly
(74) *Attorney, Agent, or Firm*—Harness, Dickey & Pierce, P.L.C.

(57) ABSTRACT

In the method of determining a time offset estimate between a central node and a secondary node, the central node receives downlink and uplink timing information from a secondary node. The downlink and uplink timing information are measured based on a periodic timing scale. The downlink timing information represents timing information for communication between the central node and the secondary node, and the uplink timing information represents timing information for communication from the secondary node to the central node. The central node compensates the timing information for time wraparound, and determines the time offset estimate based on the compensated timing information.

10 Claims, 4 Drawing Sheets

US 7,765,422 B2

METHOD OF DETERMINING A TIME OFFSET ESTIMATE BETWEEN A CENTRAL NODE AND A SECONDARY NODE

BACKGROUND OF THE INVENTION

1. Field of the Invention

The present invention relates to a method of determining a time offset estimate between a central node and a secondary node; particularly, where the nodes have periodic local timing.

2. Description of Related Art

Clock synchronization is an extremely important problem for networks and systems with distributed resources. In many cases, network nodes need to have their clocks synchronized to a common reference known as Coordinated Universal Time (UTC), simply denoted as "t". One way of achieving this goal is to use clock radio receivers of satellite-based systems such as the Global Positioning System (GPS). In situations where GPS is unavailable or cannot be utilized, different nodes of the network will set their own local timings as a totally random function of the UTC time "t".

Node synchronization then becomes a problem of "finding out" or "estimating" the differences or offsets between local node timing references. Node synchronization is a problem of prime importance in many systems (e.g., the Internet, wireless network systems, etc). And, the problem of node synchronization is particularly acute in networks that have nodes with periodic local timing.

SUMMARY OF THE INVENTION

In the method of estimating a time offset between a central node and a secondary node, the central node and the secondary node communicate to generate timing information. In one embodiment, control frames are sent between the central node and the secondary node to generate the timing information. In this embodiment, the timing information includes the time the central node sends a downlink control frame to the secondary node as measured at the central node, the time the secondary node receives the downlink control frame as measured at the secondary node, the time the secondary node sends an uplink control frame to the central node as measured at the secondary node, and the time the central node receives the uplink control frame as measured at the central node.

The central and secondary nodes operate on a periodic time scale, and the possibility of time wraparound exists. Time wraparound at the central node is where the time the central node receives the uplink control frame is less than the time the central node sent the downlink control frame because the periodic timer of the central node expired and began recounting between the sending of the downlink control frame and the receipt of the uplink control frame. Time wraparound at the secondary node can happen in a similar fashion. In the method of estimating a time offset, the timing information is compensated for time wraparound. In one embodiment, the compensation is performed by converting the timing information to a continuous time scale. Then, using the timing information, the time offset estimate is determined.

BRIEF DESCRIPTION OF THE DRAWINGS

The present invention will become more fully understood from the detailed description given herein below and the accompanying drawings, which are given by way of illustration only, and thus are not limitative of the present invention, and wherein.

DETAILED DESCRIPTION OF THE PREFERRED EMBODIMENTS

To provide a clear understanding of the invention, terminology used in describing the invention will be defined and defined in a contextual environment. Specifically, periodic local time mapping relations for node synchronization will be discussed, followed by a discussion of node synchronization objectives and applications. Then, a node synchronization control frames and the concept of time wraparound will be discussed. Next, the method of determining a time offset estimate according to the present invention will be described in detail.

Periodic Local Timing Mapping Relations for Node Synchronization

Figure 1:
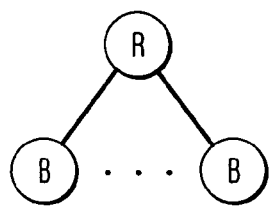
FIG. 1 illustrates a portion of a generic, well-known network structure.

FIG. 1 illustrates a portion of a generic, well-known network structure. As shown, the network structure includes a central node R connected to a plurality of secondary nodes B. Communication between the nodes R, B occurs according to any well-known basis such as frame-by-frame. For the purposes of explanation only, node synchronization will be explained for network nodes operating on a local frame-by-frame timing basis wherein a frame is defined as the local time unit of nodes R, B of predetermined duration $t_f$. In such networks, each node R, B traces the frame number FN and the frame time FT of consecutive frames. The local tracing extends up to a "Superframe" of duration $T_f = N_f * t_f$ and then periodically repeats itself, where $N_f$ equals the number of frames per superframe and $T_f$ defines the overall system period for all network nodes. The invention framework can be adapted to arbitrary values of $t_f$ and $T_f$ such that $N_f$ equals an even integer. For example, in 3GPP $t_f = 10$ ms and $T_f = 4096 * t_f = 40.96$ sec. Also, in 3GPP, the central network node R is known as the Radio Network Controller (RNC) and is centrally connected to a number of other nodes $B_i$, $i=1, 2, \ldots$, via an interface called the Iub interface, where node $B_i$'s comprise the functionality of cellular sites.

Figure 2:
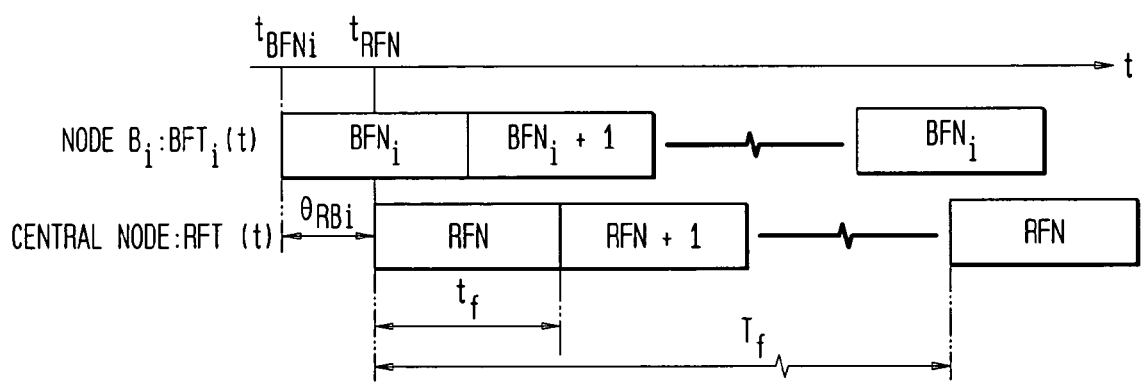
FIG. 2 illustrates the periodic local timings of a central node and a secondary node.

The local timings of the central node R and the secondary nodes $B_i$'s, as depicted in FIG. 2, are periodic in modulo $T_f$ format and the associated central node Frame Number (RFN) and node $B_i$ Frame Number ($BFN_i$) are also periodic integers in modulo $T_f$ format (i.e., RFN, $BFN_i=0, 1, \ldots, 4095$ in 3GPP). The central node frame time (RFT) and node $B_i$ frame time ($BFT_i$) can be defined to map the RFN and $BFN_i$, respectively, as a function of "t" as follows:

$$RFT(t) = h_{res}[(t-t_{RFN}) \bmod t_f] + RFN * t_f \Leftrightarrow RFT(t+T_f) = RFT(t) \quad (1)$$

$$BFT_i(t) = h_{res}[(t-t_{BFNi}) \bmod t_f] + BFN_i * t_f \Leftrightarrow BFT_i(t+T_f) = BFT_i(t) \quad (2)$$

where $h_{res}(t) = 0, \Delta_{res}, 2*\Delta_{res}, \ldots, t_f - \Delta_{res}$ is a staircase function defined within $t=[0, t_f)$ with resolution $\Delta_{res}$ which divides $t_f$, such that $\Delta_{res} \ll t_f$. For example, 3GPP currently sets a value of $\Delta_{res}=0.125$ ms, hence $\{RFT, BFT_i\}=0, \Delta_{res}, 2*\Delta_{res}, \ldots T_f - \Delta_{res}$, such that an RFT or $BFT_i$ time stamp can be contained and represented in 3 bytes. The time epochs $t_{RFN}$ and $t_{BFNi}$ define the initial central node and secondary node frame boundary, respectively (see FIG. 2), and can resume arbitrary values.

Next the time offsets between RFT and $BFT_i$ in terms of actual system parameters will be evaluated. It can be assumed, without loss of generality, that RFN and $BFN_i$ are calculated in the above equations such that the $RFN^{th}$ frame always lags the $BFN_i^{th}$ frame, i.e., their time epochs $t_{RFN}$ and $t_{BFNi}$ are configured such that $0 \leq (t_{RFN} - t_{BFNi}) < t_f$. Considering the periodic nature of RFT and $BFT_i$, their time offset $X_i$ at any absolute time "t" can be always characterized as lead/lag value such that:

$$BFT_i(t) = RFT(t+X_i) \Leftrightarrow RFT(t)BFT_i(t-X_i) \quad (3)$$

By defining, $X'_i = (BFN_i - RFN)^* t_f + (t_{RFN} - t_{BFNi})$, the time offset $X_i$ can be adjusted within $[-T_f/2, T_f/2)$ as follows:

$$X_i = X'_i, \quad \text{if } -T_f/2 \leq X'_i < T_f/2 \quad (4)$$
$$= X'_i - T_f, \text{ if } X'_i \geq T_f/2$$
$$= X'_i + T_f, \text{ if } X'_i < -T_f/2$$

The total time offset can be expressed as follows:

$$X_i = N_{RBi} * t_f + \theta_{RBi} \quad (5)$$

In the above equation, $N_{RBi} = -N_f/2, \ldots, 0, \ldots, N_f/2 - 1$ and $\theta_{RBi} = 0, \Delta_{res}, \ldots, t_f - \Delta_{res}$ are the index offset and subframe phase offset, which are evaluated as:

$$N_{RBi} = \lfloor X_i/t_f \rfloor = BFN_i - RFN, \quad \text{if } -N_f/2 \leq BFN_i - RFN < N_f/2 - 1 \quad (6)$$
$$= BFN_i - RFN - N_f, \quad \text{if } BFN_i - RFN \geq N_f/2$$
$$= BFN_i - RFN + N_f, \quad \text{if } BFN_i - RFN < -N_f/2$$

and, $\theta_{RBi} = (X_i - N_{RBi} * t_f) = t_{RFN} - t_{BFNi} \quad (7)$ where $\lfloor . \rfloor$ is the integer floor function, such that $\theta_{RBi}$ will be always positive.

Node Synchronization Objectives and Applications

In the previous analysis, it was assumed that all nodes R, B have the same time resolution $\Delta_{res}$ and that their periodic local timings are derived from local oscillators of main frequency $1/\Delta_{res}$. The assumption on frequency stability implies that there is no relative skew between different nodes, where the skew is defined as the difference between the main oscillator frequencies. However, this is not necessarily a correct assumption. For example, for 3GPP, time offsets $X_i$ between the RNC and Node $B_i$'s will arise and accumulate in the following fashion:

1. System Start:
Time offsets arise because of possibly uncoordinated system start times for all nodes and the associated random setting of the initial phase and frame number of each node. After the RNC is started, it shall detect, in time, the start of each node $B_i$ and then estimate $X_i$.

2. System Restart:
If the RNC is intentionally or accidentally restarted during normal operation, it has to re-estimate time offsets for all corresponding node $B_i$'s. If any node $B_i$ is intentionally or accidentally restarted, the RNC has to re-estimate the time offset for this particular node.

2. Frequency Drift in Normal Operation:
Even though it has been assumed that there is no main frequency skew, frequency drift for the RNC or any node $B_i$ can occur over time during normal operation, where the drift is defined as the second derivative of the oscillator phase. Such drift will cause the time offsets to build-up over time, which necessitates that the estimation of the time offset be periodically performed to update the time offset estimates.

It should be understood that no clock offset adjustment is needed or performed by the central node R or any secondary node B. In all the above scenarios, the central node R is responsible for evaluating the estimate $\hat{X}_i$ of the time offset $X_i$ between RFT and $BFT_i$ for all secondary nodes B, where the estimation strategy has to cope with the periodic local timing nature. The estimation method of this invention can be viewed in all scenarios as a single-shot procedure, during which no frequency drift is likely to take effect. This means that the time-to-sync is much smaller than any frequency drift cycle.

Having evaluated the time offset estimates, an RNC as the central node R can use such information for several important applications such as perform $BFT_i$–RFT time mapping as briefly explained previously; determine the appropriate start time for transmission of real time data from the RNC to node $B_i$ over the Iub downlink (DL); handle the frame synchronization and timing adjustment over the Iub interface in a more efficient manner, etc.

Furthermore, the uses of the time off-set estimation methodology of the present invention are not limited to 3GPP applications, but could be used with any nodal network structure such as the internet, asynchronous transfer mode (ATM) satellite networks, etc.

Control Frames and Time Wraparound

The method of estimating the time offset between the central node R and a secondary node B according to the present invention operates based on timing information measured at the central node R and the secondary node B. One method for obtaining this timing information involves the sending of control frames between the central node R and the secondary node B.

Figure 3:
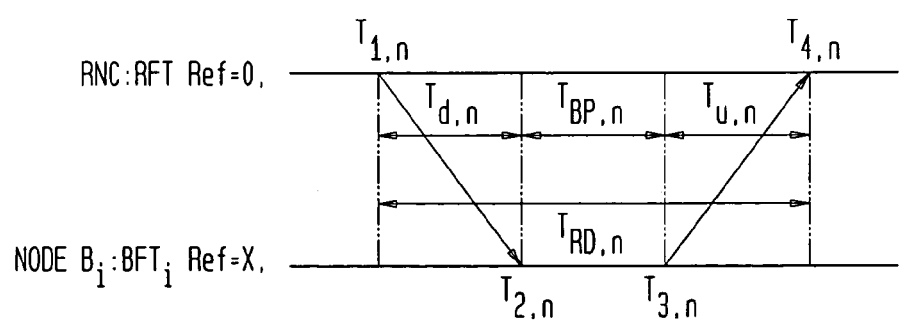
FIG. 3 illustrates the signaling concept of control frames sent between a central node and a secondary node.

The signaling concept of these control frames is shown in FIG. 3 for an $n^{th}$ measurement sample. The central node R sends a downlink (DL) node sync control frame stamped by RFT send epoch $\{T_1\}$. Namely, the time $T_1$ is the local time at the central node R when the control frame is sent to the secondary node B. The secondary node B receives that frame at $BFT_i$ receive epoch $T_2$. After certain secondary node B processing time $T_{BP}$, the secondary node B sends an uplink (UL) node sync control frame at $BFT_i$ epoch $T_3$, where this frame is stamped by $\{T_1, T_2, T_3\}$. Here, the times $T_2$ and $T_3$ are the local times measured at the secondary node B. When the central node R receives the UL node sync frame, it records the RFT receive epoch $T_4$.

It should be understood that obtaining the timing information is not limited to the control frame methodology just described. In order to further understand the principle and present the main contributions of the invention, some preliminary analysis to explain time wraparound and the time offset estimate calculation while still referring to FIG. 3 will be provided. Using the timing information $\{T_{1,n}, T_{2,n}, T_{3,n}, T_{4,n}\}$, the total round-trip-delay and the secondary node B processing time are given by:

$$T_{RD,n} = [T_{4,n} - T_{1,n} + T_f] \bmod T_f \quad (8)$$

$$T_{BP,n} = [T_{3,n} - T_{2,n} + T_f] \bmod T_f \quad (9)$$

The above formula assumes that wraparound can happen for each pair of central node R or secondary node B time epochs, and hence compensates for it. Time wraparound is where, for example, after measuring the first and second time $T_1$, the periodic timing period at the central node R expires and begins again such that $T_4 < T_1$.

Next, the DL and UL delay indicators will be defined as follows:

$$\tau_{D,n} = (T_{2,n} - T_{1,n}) = T_{D,n} + X_i \quad (10)$$

$$\tau_{U,n} = (T_{4,n} - T_{3,n}) = T_{U,n} - X_i \quad (11)$$

where $T_{D,n}$ and $T_{U,n}$ are the DL and UL link delays, respectively, which are strictly positive. A single sample time offset estimator can then be obtained as:

$$\hat{X}_i = \frac{1}{2}(\tau_{D,n} - \tau_{U,n}) = X_i + \frac{1}{2}(T_{D,n} - T_{U,n}), \quad (12)$$

adjusted within $[-T_f/2, T_f/2)$

Thus, if only one sample with $T_D = T_U$ is obtained, the time offset estimate $\hat{X}_i$ is exact. Therefore, these delay differences have to be filtered out using a certain population (e.g., N measurement samples). The time-offset estimation method does not have to be confined to only estimating the time offset $X_i$, but can also be extended to measure the minimum and maximum values of the DL and UL delays.

Method of Estimating the Time Offset

Figure 4A:
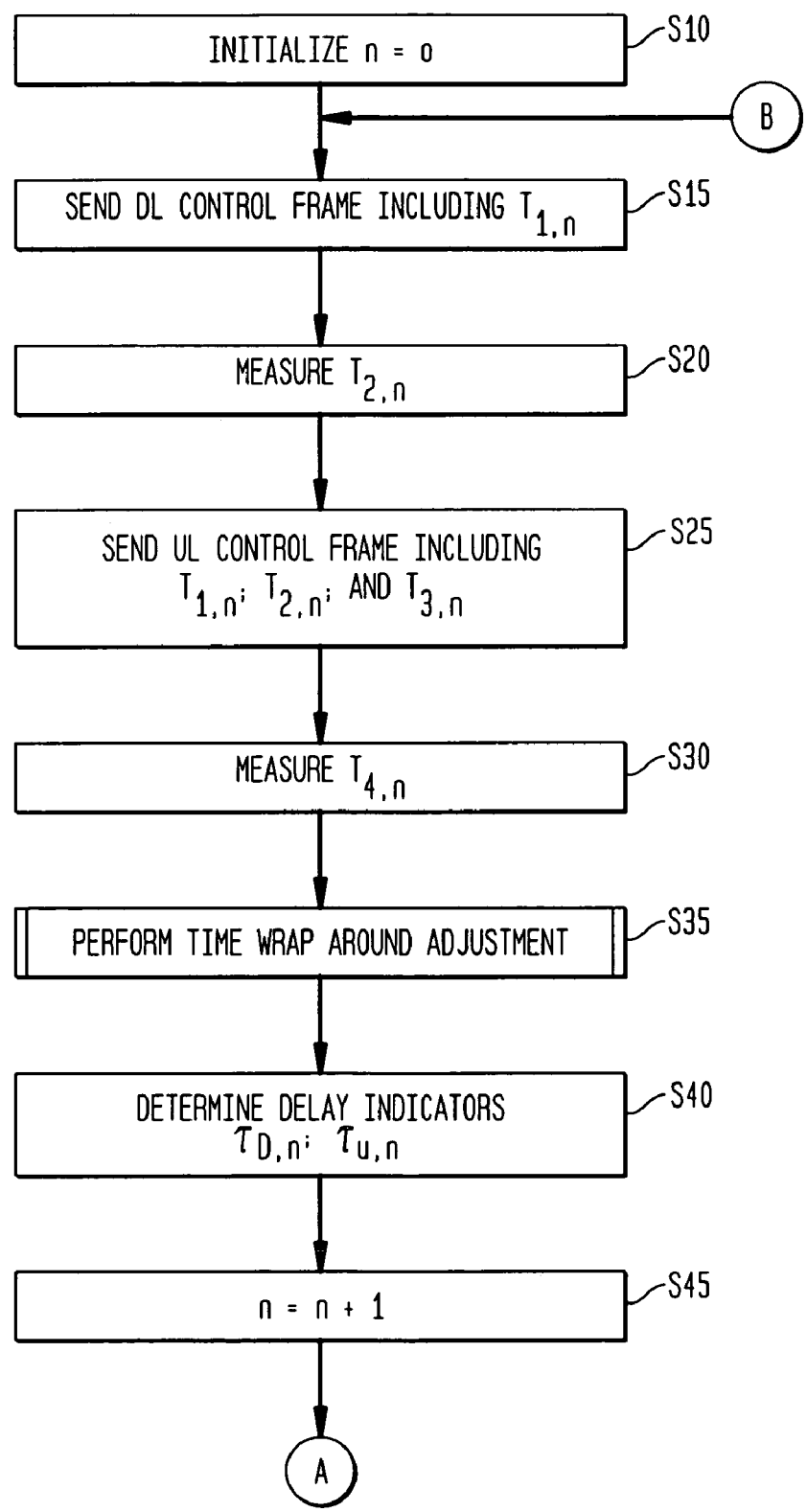
FIGS. 4A-4B illustrate a flowchart of the method for estimating the time offset according to the present invention.
Figure 4B:
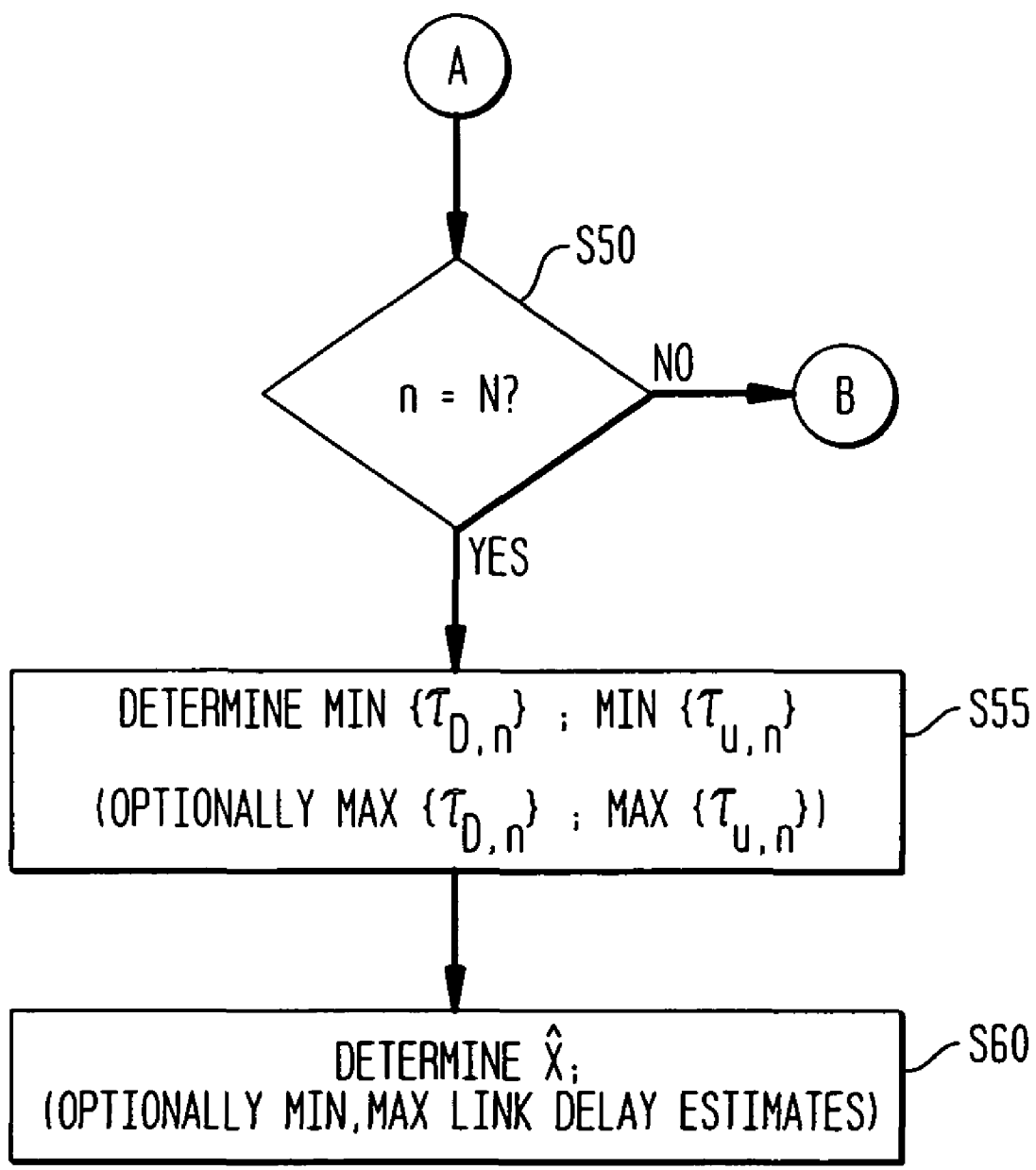
Figure 5:
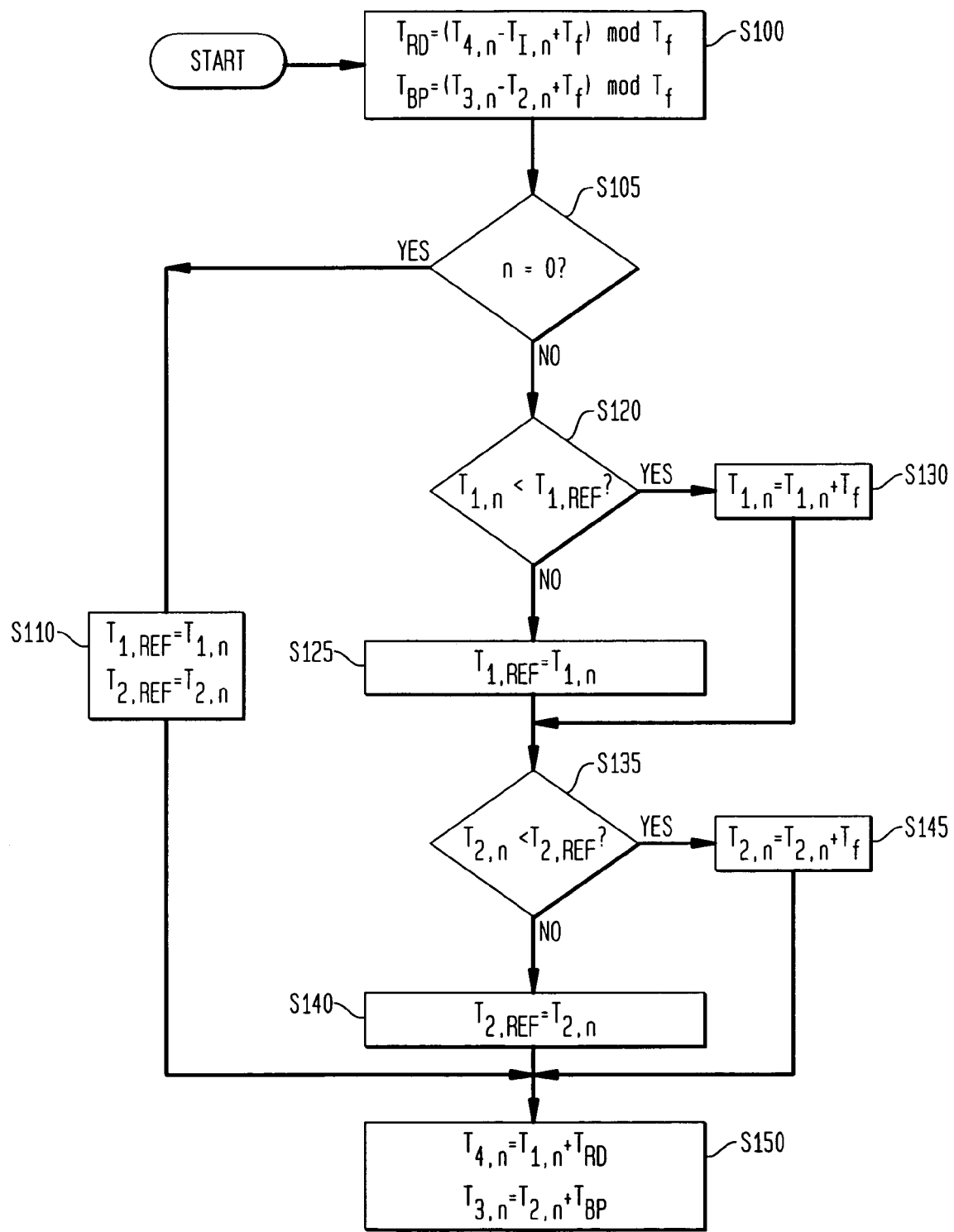
FIG. 5 illustrates the time wraparound adjustment performed in the method of estimating the time offset according to the present invention.

FIGS. 4A-4B and 5 illustrates a flowchart of the method for estimating the time offset according to the present invention. For the purposes of explanation only, the method will be described using the control frame technique for obtaining the timing information. The method begins with the central node R notifying the secondary node B that the time offset will be estimated and the secondary node B acknowledging the notification. Then in step S10, the central node R initializes a sample count n to zero.

Then, in step S15, the central node R generates and sends a DL control frame to the secondary node B. The DL control frame includes the time $T_{1,n}$ that the DL control frame was sent (the first send time). In step S20, the secondary node B receives the DL control frame and measures the time $T_{2,n}$ that the DL control frame was received (the first receive time), and processes the DL control frame. Next, in step S25, the secondary node B generates and sends an UL control frame to the central node R. The UL control frame includes the times $T_{1,n}$, $T_{2,n}$ and the time $T_{3,n}$ that the UL control frame was sent (the second send time). In step S30, the central node R receives the UL control frame and measure the time $T_{4,n}$ that the UL control frame was received (the second receive time).

Next, in step S35, the central node R performs a time wraparound adjustment on the timing information $T_{1,n}$, $T_{2,n}$, $T_{3,n}$, and $T_{4,n}$. The time wraparound adjustment performed by the central node R is illustrated in detail in FIG. 5. As shown in FIG. 5, in step S100, the central node R calculates the total round trip delay $T_{RD}$ and the secondary node processing time $T_{BP}$, compensated for time wraparound, according to equations (8) and (9). Subsequently, in step S105, the central node R determines if the timing information represents a first sample. If so, then in step S110, a reference first send time $T_{1,REF}$ and a reference first receive time $T_{2,REF}$ are set equal to the first send time $T_{1,n}$ and the first receive time $T_{2,n}$, respectively.

However, processing proceeds to step S120 if, in step S105, the sample count n does not equal zero. In step S120, the central node R determines if the first send time $T_{1,n}$ is less than the reference first send time $T_{1,REF}$. If so, then time wraparound has occurred at the central node R, and in step S130, the first send time $T_{1,n}$ is changed to $T_{1,n} + T_f$. This operation converts the first send time $T_{1,n}$ from a periodic time scale to a continuous time scale. If the central node R does not determine that the first send time $T_{1,n}$ is less than the reference first send time $T_{1,REF}$ in step S120, then processing proceeds to step S125. In step S125, the central node R sets the reference first send time $T_{1,REF}$ equal to the first send time $T_{1,n}$.

After step S130 or step S125, processing proceeds to step S135. In step S135 the central node R determines if the first receive time $T_{2,n}$ is less than the reference first receive time $T_{2,REF}$. If so, then time wraparound has occurred at the secondary node B, and in step S145, the first receive time $T_{2,n}$ is changed to $T_{2,n} + T_f$. This operation converts the first receive time $T_{2,n}$ from a periodic time scale to a continuous time scale. If the central node R does not determine that the first receive time $T_{2,n}$ is less than the reference first receive time $T_{2,REF}$ in step S135, then processing proceeds to step S140. In step S140, the central node R sets the reference first receive time $T_{2,REF}$ equal to the first send time $T_{2,n}$.

After step S140 or step S145, processing proceeds to step S150. In step S150, the second receive time $T_{4,n}$ is set equal to the first send time $T_{1,n}$ plus the total round-trip delay $T_{RD}$ and the second send time $T_{3,n}$ is set equal to the first receive time $T_{2,n}$ plus the secondary node processing time $T_{BP}$. Because the first send time $T_{1,n}$ and the first receive time $T_{2,n}$ have been compensated for time wraparound, setting the second send time $T_{3,n}$ and the second receive time $T_{4,n}$ in this manner likewise compensates for time wraparound.

Returning to FIG. 4A, having completed performing the time wraparound adjustment of step S35, the central node R determines the downlink and uplink delay indicators $\tau_{D,n}$ and $\tau_{U,n}$ according to equations (10) and (11) using the timing information in step S40. Then in step S45, the sample count n is incremented by 1, and in step S50 of FIG. 4B the central node R determines if the sample count n equals the sample population N that will allow delay differences to be filtered out. If not, then processing returns to step S15. However, if the sample count n does equal N, then in step S55 of FIG. 4B, the central node R determines the minimum and, optionally, the maximum values of the N downlink and uplink delay indicators, respectfully. Subsequently, the central node R determines the time offset estimate $\hat{X}_i$ according to equation (13) below using the minimum downlink and uplink delay indicators in step S60. Optionally, the central node R further determines the minimum and maximum uplink and downlink delays according to equation (14) and (15).

$$\hat{X}_i = \frac{1}{2}[\tau_{D,min} - \tau_{U,min}], \text{ \{adjusted within } [-T_f/2, T_f/2)\} \quad (13)$$

$$\hat{T}_{min} = \frac{1}{2}[\tau_{D,min} + \tau_{U,min}], \text{ \{no adjusted needed\}} \quad (14)$$

$$\hat{T}_{max} = \frac{1}{2}[\tau_{D,max} + \tau_{U,max}], \text{ \{no adjusted needed\}} \quad (15)$$

As will be appreciated, the time offset estimated determined according to the present invention compensates for time wraparound by, in part, converting the periodic timing information to a continuous time scale. Furthermore, delay differences are filtered out across an appropriate sampling population; the sampling population being a design parameter varying with the network to which the present invention is applied.

Correction of the DC Delay Bias Error

If the actual minimum DL and UL delays exhibit a certain difference $\Delta T_{min} = (T_{D,\ min} - T_{U,\ min})$, determined from, for example, data sheets, measurements or analysis in any well-known manner, this can cause consistent DC bias errors. The method of determining the time offset estimate according to the present invention can be modified to incorporate this information and make the following correction:

$$\hat{X}_i = \frac{1}{2}[\tau_{D,min} - \tau_{U,min} - \Delta T_{min}], \text{ \{adjusted within } [-T_f/2, T_f/2)\}$$

$$\hat{T}_{D,min} = \frac{1}{2}[\tau_{D,min} + \tau_{U,min} + \Delta T_{min}], \hat{T}_{U,min} = \frac{1}{2}[\tau_{D,min} + \tau_{U,min} - \Delta T_{min}]$$

$$\hat{T}_{D,max} = \frac{1}{2}[\tau_{D,max} + \tau_{U,max} + \Delta T_{min}], \hat{T}_{U,max} = \frac{1}{2}[\tau_{D,max} + \tau_{U,max} - \Delta T_{min}]$$

Thus using the difference $\Delta T_{min}$, the DL and UL max/min delay estimates can be configured differently. Generally, if $\Delta T_{min}$ is known, then both $T_{D,\ min}$ and $T_{U,\ min}$ are known and there is no need to estimate them. However, the value $\Delta T_{min}$ is very important for correcting the offset estimate, and changes in $T_{D,\ min}$ and $T_{U,\ min}$ can occur because of possible changes, for example, in the routing configuration.

Time-Out Options, Timer Settings & Node B Processing Time Requirements

Problems in performing the method of the present invention can also be detected by the secondary node B and the central node R. For example, when the time offset estimate process begins, the secondary node B starts a count down timer. If the timer expires before the end of the process in the middle of receiving/transmitting the plurality of the UL/DL control frames, the secondary node B reports a failure in the time offset estimate process to the central node R. At the central node R, the central node R starts a count down timer when the DL control frame is sent. If the UL control frame is not received before this timer expires, the central node discards the sample and resumes processing at step S15. If a predetermined number of samples are discarded, the central node R determines that a failure has occurred in the time offset estimate process. When such failures are determined, the failures can be reported to human operators. These problem detecting techniques assume that the sample is discarded and retransmission commences directly without waiting for the UL node sync frame to arrive. Another time-out approach is to discard the sample but wait for the UL node sync frame to arrive in order to prevent reception of invalid data in the middle of subsequent tries. This time-out approach can significantly increase the time-to-sync.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A method of determining a time offset estimate between a central node and a secondary node, comprising:

receiving, at a central node, downlink and uplink timing information from a secondary node, the downlink and uplink timing information based on a periodic timing scale, the downlink timing information representing timing information for communication from the central node to the secondary node and the uplink information representing timing information for communication from the secondary node to the central node;

converting the received downlink and uplink timing information to a continuous time scale; and determining, only after the converting step, a time offset estimate between the central node and the secondary node based on the converted downlink and uplink timing information.

2. The method of claim 1, wherein the downlink information includes a first time measured at the central node of sending a downlink frame to the secondary node and a second time measured at the secondary node of receiving the downlink frame, and the uplink information includes a third time measured at the secondary node of sending an uplink frame.

3. The method of claim 2, further comprising:

measuring, at the central node, a fourth time of receiving the uplink frame; and wherein the converting step converts the first, second, third and fourth times to a continuous time scale.

4. The method of claim 3, wherein the determining step comprises:

determining uplink and downlink delay indicators based on the converted first, second, third and fourth times; and calculating the time offset estimate based on the uplink and downlink delay indicators.

5. The method of claim 4, wherein the determining uplink and downlink delay indicators step is performed for a plurality of first, second, third and fourth time sets; and the calculating step calculates the time offset estimate based on the plurality of uplink and downlink delay indicators.

6. The method of claim 5, wherein the calculating step comprises:

determining a minimum uplink delay indicator and a minimum downlink delay indicator from the plurality of uplink and downlink delay indicators; and calculating the time offset estimate based on the minimum downlink delay indicator and the minimum uplink delay indicator.

7. The method of claim 1, further comprising:

sending a downlink frame to the secondary node, the downlink frame including a first time measured at the central node indicating when the downlink frame is sent; and wherein the receiving step receives an uplink frame at the central node, the uplink frame includes the first time, a second time measured at the secondary node of receiving the downlink frame, a third time measured at the secondary node of sending the uplink frame.

8. The method of claim 1, further comprising:
setting a timer at a start of the method; and
stopping the method if the timer times out.

9. The method of claim 1, further comprising:
compensating the time offset estimate for DC bias errors.

10. The method of claim 1, wherein the central node is a radio network controller.

* * * * *